Patented June 24, 1930

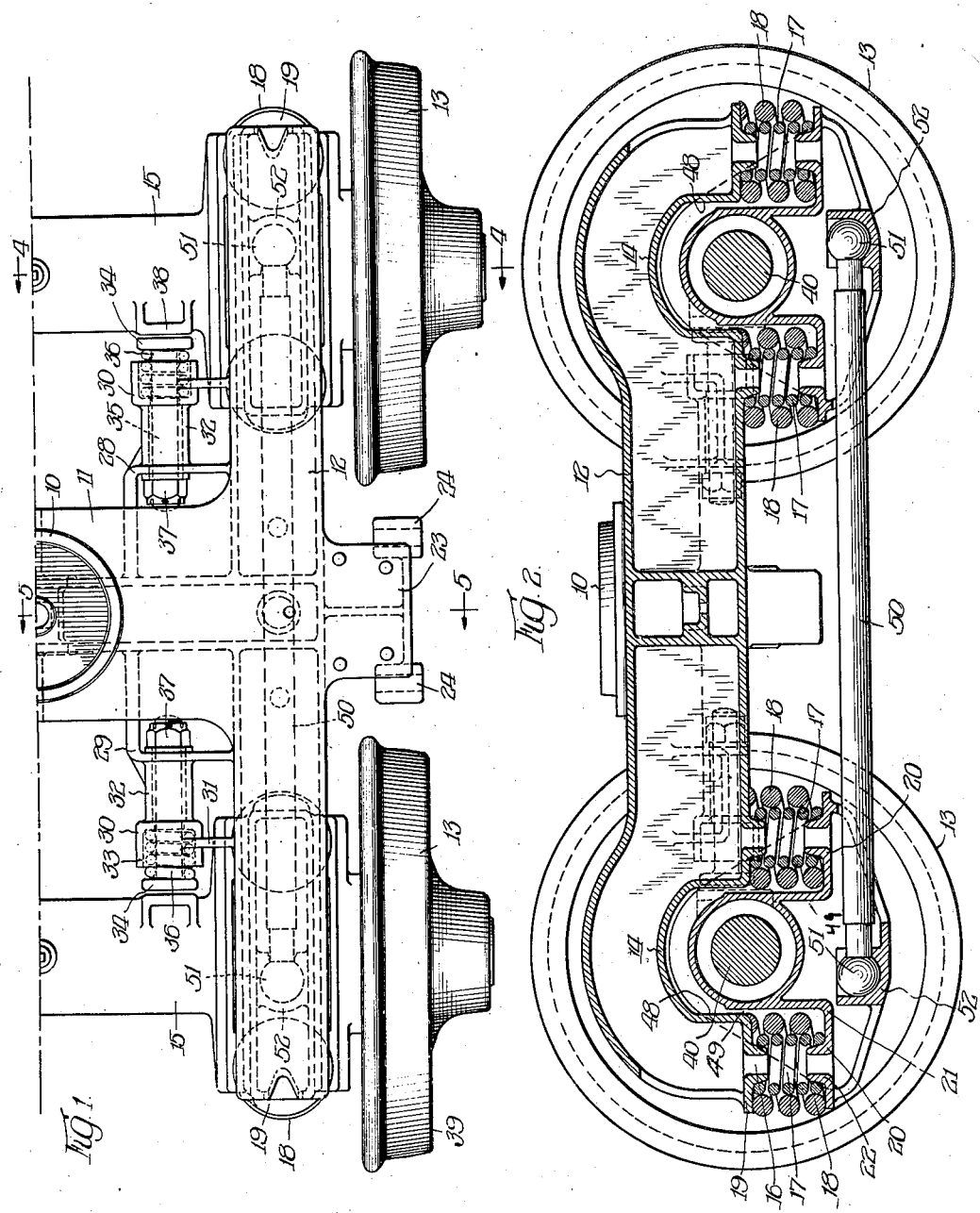

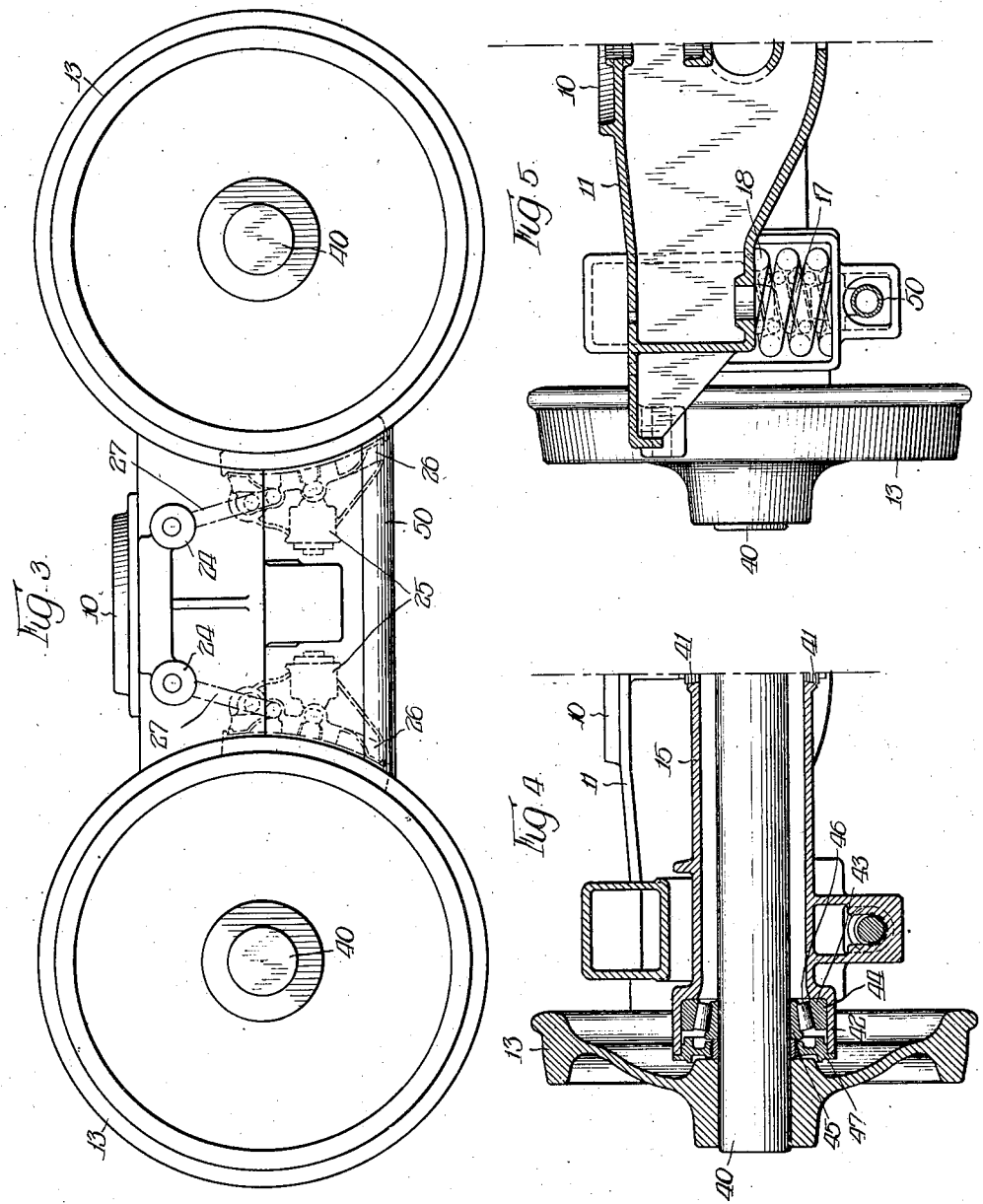

1,765,432

UNITED STATES PATENT OFFICE

JOHN A. LAMONT, OF CHICAGO, ILLINOIS, ASSIGNOR TO AMERICAN STEEL FOUNDRIES, OF CHICAGO, ILLINOIS, A CORPORATION OF NEW JERSEY

ROLLER-BEARING TRUCK

Application filed September 30, 1927. Serial No. 223,117.

This invention pertains to roller bearing trucks, and more particularly to the arrangement and suspension of various parts of such trucks.

It is an object of this invention to provide a truck having direct cooperating relation between the axles and the truck suspension means.

Another object is to provide suspension means so related to various parts of the truck assembly that relative movement between parts of the truck are at least partially absorbed by suspension means.

Still another object is to provide shock absorbing means between the axle and parts of the truck assembly so that together with the arrangement of various other parts, the bearings will be subjected to the least possible shock and distortion under normal working conditions.

A further object is to provide shock absorbing means for a truck assembly so disposed as to be effective before suspension means are affected by frame movement.

Still further object is to provide a truck having axle spacing means so disposed as to provide emergency supports for running gear particularly that gear associated with hanger brackets provided on the frames.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a plan of substantially one-half of a truck embodying the invention;

Figure 2 is a sectional elevation of the truck shown in Figure 1, the same being taken substantially in the plane of the centerline of the truck illustrated in Figure 1;

Figure 3 is a side elevation of the truck;

Figure 4 is a sectional end elevation of the truck, the same being taken substantially in the plane as indicated by the line 4—4 of Figure 1; and Figure 5 is a sectional end elevation through the truck, the same being taken substantially in the plane as indicated by the line 5—5 of Figure 1.

Although only one side of the truck is illustrated and described, it will of course be understood that the description applies to the corresponding parts on the other side of the truck.

The roller bearing truck consists essentially of a center bearing 10 carried by the cross-member or bolster 11 terminating in a side frame 12 supported on and carried by the wheel and axle assemblies 13. The frame 12 terminates at either end in U-shaped or downwardly directed bifurcations or jaw portions 14 adapted to straddle the outer axles 15 of the axle assembles, said jaw portions being provided on either side of said axles with downwardly projecting dowels 16 providing positioning means for inner and outer coil springs 17 and 18 disposed between spring seats 19 and 20 provided on the jaws and on projections or platforms 21 on the outer axle. The projections 21 are disposed below the outer axles and are provided on the spring seats with upwardly extending dowels 22 similar to dowels 16 for positioning the inner and outer spring members. If leaf springs are contemplated to replace the coil springs, the dowels may take the form of securing lugs so that this part of the assembly will accomplish equivalent work. The side frame adjacent the center thereof is formed with a brake hanger bracket 23 provided on either side adjacent the wheels with lugs 24 adapted to support the brake gear 25 including shoe 26, suspension links 27 and other gear.

On the inside of the frame 12 on either side of the bolster 11, there are provided bracket members 28 which may consist substantially of a box bracket 29 preferably integral with the shock absorber containing member 30 bracketed to the side frame as at 31. The shock absorber member 30 consists essentially of a tubular portion 32 terminating in an enlarged annular shouldered portion 33. The shock absorber is provided with a vertical face or shoe 34 preferably integral with a cylindrical portion or stem 35 extending through the tubular support 30 and having a coil spring 36 disposed between the shoe and the shoulder of the annular member 33, tending to force the shoe outwardly toward the axles, the outward movement thereof being limited by any means such as the nut 37 provided on the threaded end of the stem 35 of the shock absorber. The shoe 34 is adapted to have contact with a corresponding shoe member 38 disposed in way of the shoe 34 and preferably integral with the outer stationary axle member 15.

The axle assemblies 13 consist essentially of wheels 39 disposed on integral rotary axles 40' extending between pairs of wheels and through fixed axle members 15. The outer axle members may be of any suitable construction, having lubricant plugs 41 disposed therein and terminating at either end in bearing recesses 42 containing any convenient form of bearings 43, such as Timken, self-aligning or any other type. Said bearings preferably include outer and inner race-rings 44 and 45 cooperating with their respective axles and between which rings rollers 46 are provided. Cover plates 47 are disposed between the axles adjacent the wheels and are so constructed as to prevent the lubricant from leaking out of the assemblies.

Clearance is provided between the vertical faces 48 and 49 on either side of the frame jaw and outer axles, this clearance being preferably greater than the clearance between the shoes 34 and 38 of the shock absorber and outer axle, for the purpose of bringing the shock absorber into operation so that any action of the car body tending to cause movement of the frame relative to the axles longitudinally of the truck will be absorbed through the shock absorbers rather than wholly through the springs 17 and 18 or through the columns and guides on the axle and frame jaws. The clearance between the shoes may be conveniently limited to approximately one-half of the clearance between the jaws and the outer axle.

It is evident that any variation in the length of the springs 17 and 18 would tend to set the spring seats at an angle to the vertical, but being integral portions of the outer axle, the possibilities are reduced at least one-half by the chance that the springs on the opposite ends of the axle will not be similarly arranged. This tendency as well as any tendency of the center lines of the axles varying in operation is reduced by means of equalizer bars 50 provided on either side of the truck which tie the spring seats together. These bars may be provided at either end with spherical portions 51 cooperating with seats or sockets 52 preferably integral with a portion of the depressed portion of the outer axles, though it is to be understood of course that any connection allowing suitable movement between the equalizer bars and the spring seats may be used. This equalizer bar fixes more exactly the center lines of the axles or wheel base of the truck against any action of the car or any action by the brakes tending to spread the wheels or lengthen the wheel base. The bar due to its lowered position serves the further purpose of a safety support for the brake beams in case of failure of the hangers, preventing the brake gear from dropping on the track, damaging the roadbed or having any tendency to derail the cars.

It is to be understood that I do not wish to be limited by the exact embodiment of the device shown, which is merely by way of illustration and not limitation, as other and various forms will of course be apparent to those skilled in the art.

I claim:

1. In wheel and axle assemblies for railway trucks and the like, the combination of inner and outer axles associated with wheels, and spring seats integral with one of said axles.

2. In wheel and axle assemblies for railway trucks and the like, the combination of inner and outer axles associated with wheels, and spring seats disposed on either side of said assemblies and integral with one of said axles.

3. In a device of the character described, the combination of frames adapted to be associated with a railway vehicle or the like, wheel and axle assemblies including seats integral with axles of said assemblies, seats integral with said frames, and flexible means between said seats.

4. In a device of the character described, the combination of frames adapted to be associated with a railway vehicle or the like, wheel and axle assemblies including seats integral with axles of said assemblies, seats integral with said frames, housings for said seats, and flexible means between said seats disposed with clearance between said flexible means and said housings.

5. In a device of the character described, the combination of frames adapted to be associated with a railway vehicle or the like, wheel and axle assemblies including seats integral with axles of said assemblies, seats integral with said frames, flexible means between said seats, and shock absorbing means between said frames and assemblies.

6. In a device of the character described, the combination of frames, wheel and axle assemblies including seats integral with axles of said assemblies, seats integral with said frames, housings for said seats, flexible means between said seats disposed with clearance between said flexible means and said housings, and shock absorbing means between said frames and assemblies operative before said clearance is taken up.

7. In a device of the character described, the combination of frames, wheel and axle assemblies including seats integral with axles of said assemblies, seats integral with said frames, flexible means betweeen said seats, and equalizing means between said assemblies.

8. In a device of the character described, the combination of frames, wheel and axle assemblies including seats integral with axles of said assemblies, seats integral with said frames, housings for said seats, flexible means between said seats disposed with clearance between said flexible means and said housings, and equalizing means between said assemblies.

9. In a device of the character described, the combination of frames, wheel and axle assemblies including seats integral with axles of said assemblies, seats integral with said frames, flexible means between said seats, seating means integral with axles, and equalizing means cooperating with pairs of seats between axles serving to maintain said axles in constant spaced relation to each other.

10. In a device of the character described, the combination of frames, wheel and axle assemblies including seats integral with axles of said assemblies, seats integral with said frames, housings for said seats, flexible means between said seats disposed with clearance between said flexible means and said housings, seating means integral with axles, and equalizing means cooperating with pairs of seats between axles serving to maintain said axles in constant spaced relation to each other.

11. In a device of the character described, the combination of cooperating frames and wheel and axle assemblies, said frames having side bearings and brake hanger brackets disposed between said assemblies, and means for maintaining said assemblies in constant relation so disposed as to form a safety support for gear cooperating with said brake hanger brackets.

12. In wheel and axle assemblies, the combination of inner and outer axles associated with wheels, and spring seats disposed on either side of said assemblies integral with said outer axles and below said inner axles.

13. In a device of the character described, the combination of frames adapted to be associated with a railway vehicle or the like, wheel and axle assemblies including inner and outer axles and seats integral with said outer axles, seats integral with said frames and disposed for cooperating engagement with resilient means disposed between said seats.

14. In a device of the character described, the combination of frames, wheel and axle assemblies including inner and outer axles and seats, and housings integral with said outer axles, seats integral with said frames and disposed for cooperating engagement with resilient means disposed in said housings between said seats and having clearance between said resilient means and said housings.

15. In a device of the character described, the combination of frames, wheel and axle assemblies including inner and outer axles and seats integral with said outer axles, seats integral with said frames and disposed for cooperating engagement with resilient means disposed between said seats, and shock absorbing means between said frames and assemblies.

16. In a device of the character described, the combination of frames, wheel and axle assemblies including inner and outer axles and seats, housings integral with said outer axles, seats integral with said frames and disposed for cooperating engagement with resilient means disposed in said housings between said seats and having clearance between said resilient means and said housings, and shock absorbing means between said frames and assemblies operative before said clearance is taken up.

17. In a device of the character described, the combination of frames, wheel and axle assemblies including inner and outer axles and seats integral with said outer axles, seats integral with said frames and disposed for cooperating engagement with resilient means disposed between said seats, and equalizing means between said assemblies.

18. In a device of the character described, the combination of frames, wheel and axle assemblies including inner and outer axles and seats, housings integral with said outer axles, seats integral with said frames and disposed for cooperating engagement with resilient means disposed in said housings between said seats and having clearance between said resilient means and said housings, shock absorbing means between said frames and assemblies operative before said clearance is taken up, and equalizing means between said assemblies.

19. In a wheel and axle assembly for railway trucks and the like, the combination of a fixed axle, a rotary axle extending therethrough and having wheels mounted on the ends thereof, bearings disposed between said axles, and a spring seat integral with one of said axles.

20. In a wheel and axle assembly for railway trucks and the like, the combination of a fixed axle, a rotary axle extending therethrough and having wheels mounted on the ends thereof, bearings disposed between said axles, and a spring seat integral with said fixed axle.

21. In a wheel and axle assembly, for railway trucks and the like, the combination of a fixed axle, a rotary axle extending therethrough and having wheels mounted on the ends thereof, bearings disposed between said axles, and an equalizer bracket integral with one of said axles.

22. In a wheel and axle assembly for railway trucks and the like, the combination of a fixed axle, a rotary axle extending therethrough and having wheels mounted on the ends thereof, bearings disposed between said axles, and an equalizer bracket integral with said fixed axle.

23. In a wheel and axle assembly for railway trucks and the like, the combination of a fixed axle, a rotary axle extending therethrough and having wheels mounted on the ends thereof, bearings disposed between said axles, and an equalizer bracket integral with said fixed axle and formed below said rotary axle.

24. In a wheel and axle assembly for railway trucks and the like, the combination of a fixed axle, a rotary axle extending therethrough and having wheels mounted on the ends thereof, bearings disposed between said axles, and a spring seat and spring positioning means formed integral with one of said axles, 25. In a wheel and axle assembly for railway trucks and the like, the combination of a fixed axle, a rotary axle extending therethrough and having wheels mounted on the ends thereof, bearings disposed between said axles, and a spring seat and spring positioning means formed integral with said fixed axle.

26. In a wheel and axle assembly, the combination of a fixed axle, a rotary axle extending therethrough and having wheels mounted on the ends thereof, bearings disposed between said axles, a spring seat and spring positioning means formed integral with said fixed axle, and an equalizer bracket integral with said fixed axle.

27. In a truck, the combination of a frame, said frame including a transversely extending bolster connecting transversely spaced side frames, each of said frames having pairs of spaced column guides, a wheel and axle assembly associated with each pair of column guides on said frames, said assembly including a transverse inner rotary axle having wheels mounted thereon to rotate therewith, an outer non-rotatable axle through which said inner axle extends, bearings between axles, columns on said outer axle disposed between and in cooperative relation with said column guides, spring seats on said frames, spring seats disposed on said outer axle and integral therewith and arranged on each side of said axle in alignment with said first named spring seats, springs between said spring seats, equalizer brackets disposed on each of said outer axles and integral therewith, said brackets being below said inner axles, equalizer members connecting said outer axles and cooperating with said equalizer brackets, and shock absorber means disposed between said fixed axle and said frames.

28. In a truck, the combination of a frame, said frame including a transversely extending bolster connecting transversely spaced side frames, each of said frames having pairs of spaced column guides, a wheel and axle assembly associated with each pair of column guides on said frames, said assembly including a transverse inner rotary axle having wheels mounted thereon to rotate therewith, an outer non-rotatable axle through which said inner axle extends, bearings between axles, columns on said outer axle disposed between and in cooperative relation with said column guides, shock absorber means disposed between said fixed axle and said frames, said means including a housing integral with said frame, bearings on said outer axle, and spring pressed members adapted to be engaged by said bearings.

29. In a truck, the combination of a frame, said frame including a transversely extending bolster connecting transversely spaced side frames, each of said frames having pairs of spaced column guides, a wheel and axle assembly associated with each pair of column guides on said frames, said assembly including a transverse inner rotary axle having wheels mounted thereon to rotate therewith, an outer non-rotatable axle through which said inner axle extends, bearings between axles, columns on said outer axle disposed between and in cooperative relation with said column guides, spring sets on said frames, spring seats disposed on said outer axle and integral therewith and arranged on each side of said axle in alignment with said first named spring seats, springs between said spring seats, equalizer brackets disposed on each of said outer axles and integral therewith, said brackets being below said inner axles, equalizer members connecting said outer axles and cooperating with said equalizer brackets, shock absorber means disposed between said fixed axle and said frames, said means including a housing integral with said frame, bearings on said outer axle, and spring pressed members adapted to be engaged by said bearings.

30. In wheel and axle assemblies, the combination of an axle having spring seats formed integral therewith, and an equalizer seat disposed below said spring seats and formed integral with said axle.

31. In a truck assembly, the combination of a truck frame, wheel and axle assemblies cooperating therewith, and means movable with respect to said wheel and axle assemblies and disposed between said wheel and axle assemblies and extending continuously therebetween for maintaining the relative position of said axles substantially constant.

32. In a truck assembly, the combination of a truck frame, wheel and axle assemblies cooperating therewith, and means disposed between said wheel and axle assemblies and extending continuously therebetween, said means being secured to said wheel and axle assemblies, said wheel and axle assemblies having means adapted to be moved to contact said means whereby stresses in one of said wheel and axle assemblies is at least partially conducted to the other wheel and axle assembly.

33. In a truck assembly, the combination of a truck frame, wheel and axle assemblies cooperating therewith, and means disposed between said wheel and axle assemblies and extending continuously therebetween, a spring seat formed on each of said wheel and axle assemblies adjacent the connection of said means thereto, said seats being adapted to be moved to contact said means whereby stresses in one of said wheel and axle assemblies is at least partially conducted to the other wheel and axle assembly.

34. In a truck, the combination of spaced axles, wheels cooperating therewith, a truck frame having portions embracing portions of said axles, and resilient members disposed between said axles and said frame on both sides of said axles.

35. In a truck, the combination of spaced axles, wheels cooperating therewith, a truck frame having portions embracing portions of said axles, and resilient members disposed between said axles and said frame on both sides of said axles and continuous equalizing members disposed between each of said axles and cooperating therewith.

36. A vehicle axle having spring seats formed thereon, and dowels projecting from said seats and forming means for positioning springs associated with said seats.

37. A vehicle axle having a platform portion formed thereon extending outwardly from said axle, and dowels projecting from said platform portion forming means for positioning springs associated with said platform portion.

38. A vehicle axle having a platform portion formed thereon on each side of said axle and extending outwardly therefrom, and positioning means provided on each of said platform portions for positioning springs disposed on each of said platform portions.

Signed at Chicago, Illinois, this 27th day of September, 1927.

JOHN A. LAMONT.